March 14, 1933.   E. G. CARLSON   1,901,345
CHAIN CONNECTING LINK
Filed Dec. 19, 1930
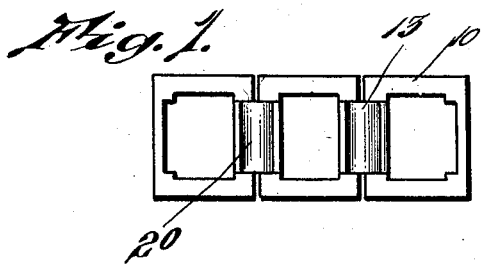
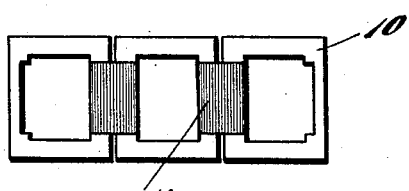
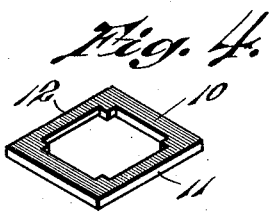
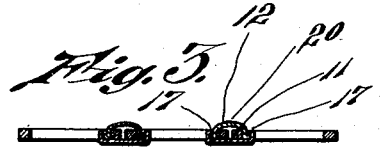
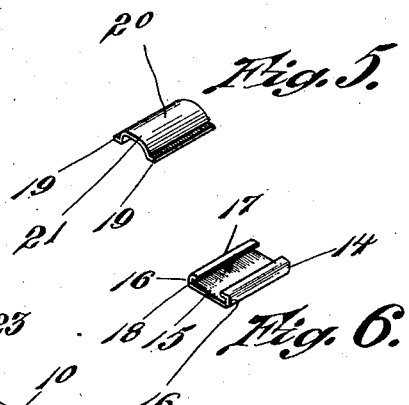
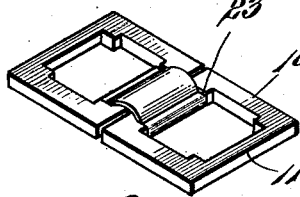
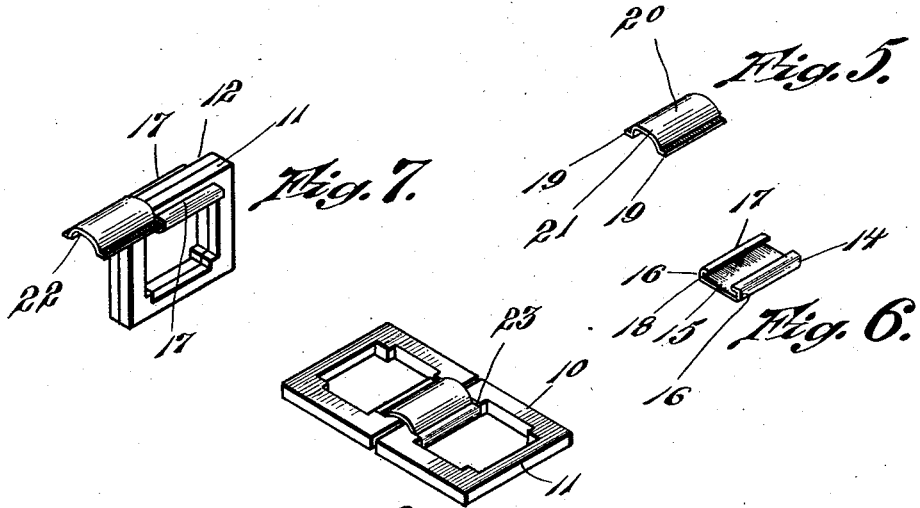
INVENTOR.
Edwin G. Carlson
BY Barlow & Barlow
ATTORNEYS.

Patented Mar. 14, 1933

1,901,345

UNITED STATES PATENT OFFICE

EDWIN G. CARLSON, OF RIVERSIDE, RHODE ISLAND, ASSIGNOR TO SPEIDEL CHAIN CO., OF PROVIDENCE RHODE ISLAND, A FIRM COMPOSED OF FREDERIC SPEIDEL AND EUGEN SPEIDEL

CHAIN CONNECTING LINK

Application filed December 19, 1930. Serial No. 503,507.

This invention relates to a connecting link for a chain, and has for its object to provide a construction in which one link may be manually disconnected from the others for removal from the chain to shorten the length thereof or an additional link may be supplied to extend the length of the chain without the use of tools.

Another object of this invention is the provision of a chain so constructed that it will cooperate with the connecting link to hold the separable parts of the connecting link together when the chain is in working position but permit their ready removal when the chain is doubled upon itself.

A further object of the invention is the provision of a connecting link which is simply constructed and may be held together by frictional engagement of its parts.

A still further object of the invention is the provision of a connecting link having two members which are held together by a lateral sliding movement and interengagement of their edges.

With these and other objects and advantageous features in view, the invention consists of a novel arrangement of parts more fully disclosed in the detailed description following, in conjunction with the accompanying drawing, and more particularly set forth in the appended claims.

In the drawing:

Fig. 1 is a top plan view of a chain with my improved connecting link;

Fig. 2 is a bottom view thereof;

Fig. 3 is a central section of the chain;

Fig. 4 is a perspective view of one of the body links of the chain;

Fig. 5 is a perspective view of one member of the connecting link;

Fig. 6 is a perspective view of another member of the connecting link;

Fig. 7 is a perspective view of two of the body links doubled back to back with the top member of the connecting link just entering the bottom member thereof for assembly of the chain;

Fig. 8 is a perspective view of the chain in working position, in which position the connecting link is maintained in place.

In the use of flexible chains for bracelets and the like, it is often desirable to shorten or lengthen the chain to accommodate the same to the varying sizes of wrists of the users; and to accomplish this, it is desirable to provide means whereby a link may be removed or added to the chain for this purpose, and in order to attain this result, I have provided a chain with the connecting links formed of two parts or members, which members may be assembled by a simple lateral sliding of the parts together, and the chain is so constructed that when in working position, the body links will prevent the members of the connecting link from sliding apart, but when doubled upon itself will permit the members to be moved laterally and taken apart to disconnect the chain; and the following is a detailed description of the present embodiment of this invention illustrating one means by which these advantageous results may be accomplished.

With reference to the drawings, 10 designates the body link which is provided with end bars 11 and 12 connected together by a connecting link 13 which is composed of a channel-shaped member 14 having a bottom wall 15, side walls 16 and inturned lips 17, forming a groove or track 18 to receive the flanges 19 of the top member 20, which is generally arcuate as illustrated at 21 for accommodation of the cross bars 11 and 12, as illustrated in Figures 3 and 7. The cross bars 11 and 12 are received within the channel member 14 and between the edges of the lips 17 thereof, while the top member 20 is slid beneath the lips 17 when the chain is doubled upon itself as indicated in Figure 7 to be frictionally engaged by the lips 17 and bottom wall 15 and cause the connecting link to completely embrace the cross bars 11 and 12.

When the chain is flexed from its doubled backed position, shown in Figure 7 to its working position shown in Figure 8, the edges 22 of the upper member 20 and also the edges of the lower member lie between the inner edges 23 of the body link 10 to prevent relative lateral movement of the members of the connecting link, thus the same is securely locked against accidental detachment when in use as the chain cannot at that time assume the position shown in Figure 7 to permit detachment of the members.

The parts are held together mechanically and yet provide a free and easy hinging action between the body links for completely flexing the chain.

While I have described certain construction forms which embody the principles of my invention, it is obvious that other desired changes in arrangement may be made within the spirit and the scope of the invention as defined in the appended claims.

I claim:

1. In a chain, body links, connecting links comprising two members, and means for connecting or disconnecting said members by a relative movement of said members with parts of one sliding on parts of the other substantially throughout the length of said members in a plane between the planes of the opposite surfaces of the body links of the chain laterally of the chain.

2. In a chain, a sheet metal connecting link comprising a channel-shaped member with inturned lips on its side walls for receiving cross bars of the body links of the chain, and a cover member arcuate in shape with edge flanges located in the same plane and slidable beneath said lips, the top surface of said lips being located in substantially the same plane as the top surface of the cross bars of the body links received.

3. In a chain, a series of body links, each having cross bars at their ends, connecting links for said body links having two members embracing adjacent cross bars, said members being slidably connected together and prevented from separation by engagement with the inner edge of the body links when in working position.

4. In a chain, a series of body links, connecting links therefor having two members secured together and embracing portions of said body links to hingedly connect them together, cooperating means between said links for holding said members in secured position when the chain is extended, but permitting said members to be disconnected when the connected links are doubled upon themselves.

5. In a chain, a series of body links, connecting links therefor having two members secured together and embracing portions of said body links to hingedly connect them together, cooperating means between said links for holding said members in secured position when the chain is extended, but permitting said members to be laterally moved apart when the links of the chain are doubled upon themselves.

6. In a chain, a sheet metal connecting link comprising two separable members, one of said members being a flat plate with inturned edges and the other of said members having flanges in a single plane to slidably engage said inturned edges with an arcuate portion between said flanges, the engaging portions of said members lying between side bars of the links of the chain when in normal position to prevent their separation.

7. In a chain, a sheet metal connecting link comprising two separable members, one of said members consisting of a flat plate having inturned edges and the other of said members having flanges in a single plane to slidably engage said inturned edges, said flanges being tightly frictionally received in said inturned edges to hold the same against inadvertent relative movement, and the engaging portions of said memebrs lying between side bars of the links of the chain when in normal position to prevent their separation.

In testimony whereof I affix my signature.

EDWIN G. CARLSON.